(12) United States Patent
Li et al.

(10) Patent No.: US 12,379,353 B2
(45) Date of Patent: Aug. 5, 2025

(54) METHOD AND SYSTEM FOR DENOISING HIGH-FREQUENCY ULTRASOUND BASED ON MULTIPATH MATCHING PURSUIT ALGORITHM

(71) Applicants: JIANGNAN UNIVERSITY, Wuxi (CN); CHINA KEY SYSTEM & INTEGRATED CIRCUIT CO. LTD., Wuxi (CN)

(72) Inventors: Ke Li, Wuxi (CN); Xuefei Ming, Wuxi (CN); Lei Su, Wuxi (CN); Jiefei Gu, Wuxi (CN); Xinwei Zhao, Wuxi (CN)

(73) Assignees: JIANGNAN UNIVERSITY, Jiangsu (CN); CHINA KEY SYSTEM & INTEGRATED CIRCUIT CO. LTD., Jiangsu (CN)

( * ) Notice: Subject to any disclaimer, the term of this patent is extended or adjusted under 35 U.S.C. 154(b) by 0 days.

(21) Appl. No.: 18/627,342

(22) Filed: Apr. 4, 2024

(65) Prior Publication Data

US 2025/0102475 A1    Mar. 27, 2025

Related U.S. Application Data

(63) Continuation of application No. PCT/CN2023/095645, filed on May 23, 2023.

(30) Foreign Application Priority Data

Jun. 30, 2022 (CN) .......................... 202210782948.1

(51) Int. Cl.
*G01N 29/44* (2006.01)
*G01N 29/28* (2006.01)

(52) U.S. Cl.
CPC ......... *G01N 29/4463* (2013.01); *G01N 29/28* (2013.01); *G01N 29/4418* (2013.01); *G01N 29/449* (2013.01); *G01N 2291/0289* (2013.01)

(58) Field of Classification Search
CPC ............... G01N 29/4463; G01N 29/28; G01N 29/4418; G01N 29/449; G01N 2291/0289
See application file for complete search history.

(56) References Cited

U.S. PATENT DOCUMENTS 8,863,044 B1    10/2014   Casati et al.

FOREIGN PATENT DOCUMENTS

| CN | 103176947 A | 6/2013 |
|---|---|---|
| CN | 109191399 A | 1/2019 |

(Continued)

OTHER PUBLICATIONS

"Compressed Sensing Reconstruction of 3D Ultrasound Data Using Dictionary Learning and Line-Wise Subsampling", Lorintiu et al. (Year: 2015).*

(Continued)

*Primary Examiner* — Xin Y Zhong
(74) *Attorney, Agent, or Firm* — SZDC Law PC (57) ABSTRACT

The present invention provides an improved method and system for denoising high-frequency ultrasound based on a multipath matching pursuit algorithm. The method includes: acquiring a high-frequency ultrasound detection signal of a to-be-tested sample; constructing a discrete overcomplete dictionary according to the high-frequency ultrasound detection signal, and training the discrete overcomplete dictionary; reconstructing the high-frequency ultrasound detection signal by using a trained dictionary and using a multipath matching pursuit algorithm, and obtaining a global optimal atom; performing interpolation on the global optimal atom, and constructing a consecutive atomic library; and reconstructing the high-frequency ultrasound detection signal in the consecutive atomic library according to a parameter of the global optimal atom, to complete signal denoising. In the present invention, a signal-to-noise ratio and detection pre- (Continued)

cision of a high-frequency ultrasound signal are improved, so that a reflected signal and a position of a microdefect inside a sample can be observed more effectively.

9 Claims, 3 Drawing Sheets

(56) References Cited

FOREIGN PATENT DOCUMENTS

| CN | 112861731 A | 5/2021 |
|---|---|---|
| CN | 113449683 A | 9/2021 |
| CN | 114235970 A | 3/2022 |
| CN | 115236206 A | 10/2022 |

OTHER PUBLICATIONS

"A Unified Approach to Sparse Signal Processing", Marvasti et al. (Year: 2011).*

* cited by examiner

METHOD AND SYSTEM FOR DENOISING HIGH-FREQUENCY ULTRASOUND BASED ON MULTIPATH MATCHING PURSUIT ALGORITHM

This application is a Continuation Application of PCT/CN2023/095645, filed on May 23, 2023, which claims priority to Chinese Patent Application No. 202210782948.1, filed on Jun. 30, 2022, which is incorporated by reference for all purposes as if fully set forth herein.

FIELD OF THE INVENTION

The present invention belongs to the field of signal processing technologies, and specifically to an improved method and system for denoising high-frequency ultrasound based on a multipath matching pursuit algorithm.

DESCRIPTION OF THE RELATED ART

At present, there are already mature denoising technologies for signal denoising. However, there is no dedicated processing technology for a high-frequency ultrasound signal. Very large differences exist between a high-frequency ultrasound signal and a common signal. In one aspect, a high-frequency ultrasound signal is a pulse signal, which has relatively concentrated energy and has a high time resolution requirement for processing technologies. In another aspect, a high-frequency ultrasound signal has an extremely high frequency, and therefore also has extremely high sampling frequency requirement. As a result, a high-frequency ultrasound signal has large dimensions, and therefore has a high calculation efficiency requirement for processing technologies.

During propagation of high-frequency ultrasound inside a sample, the ultrasound is reflected at different interfaces, generating different reflected signals (echoes). With this characteristic, a sample may be scanned by using high-frequency ultrasound to detect a microdefect inside the sample. Because different materials have different acoustic resistances, ultrasound is reflected, refracted, and diffracted in a propagation process. The strength of a reflected signal changes at a material discontinuity. Therefore, effective diagnosis of a defect can be implemented by analyzing an echo signal. However, during actual detection, an object in high-frequency ultrasound detection is tiny, and a reflected echo signal is weak. Ultrasound detection echo signal includes information related to a position, a size, and a feature of a defect. Because the high-frequency ultrasound detection is susceptible to material grain noise and detection system noise, a reflected echo of a defect is drowned out in the noise, which greatly limits the detection precision and accuracy of the high-frequency ultrasound detection.

SUMMARY OF THE INVENTION

Embodiments of the present invention provide an improved method and system for denoising high-frequency ultrasound based on a multipath matching pursuit algorithm, to solve problems that a signal of a tiny defect has a low signal-to-noise ratio and detection precision is low in high-frequency ultrasound detection in the prior art.

The embodiments of the present invention provide an improved method for denoising high-frequency ultrasound based on a multipath matching pursuit algorithm. The method includes:

S1: acquiring a high-frequency ultrasound detection signal of a to-be-tested sample;

S2: constructing a discrete overcomplete dictionary according to the high-frequency ultrasound detection signal, and training the discrete overcomplete dictionary;

S3: reconstructing the high-frequency ultrasound detection signal by using a trained dictionary and using a multipath matching pursuit algorithm, and obtaining a global optimal atom;

S4: performing interpolation on the global optimal atom, and constructing a consecutive atomic library; and S5: reconstructing the high-frequency ultrasound detection signal in the consecutive atomic library according to a parameter of the global optimal atom, to complete signal denoising.

Preferably, a method for acquiring a high-frequency ultrasound detection signal of a to-be-tested sample in step S1 is:

completely immersing the to-be-tested sample in deionized water, scanning the to-be-tested sample by using a high-frequency ultrasound probe, and saving a high-frequency ultrasound detection signal acquired in a scanning process, where a focal plane of the high-frequency ultrasound probe is disposed on a bottom surface of the to-be-tested sample.

Preferably, a method for constructing a discrete overcomplete dictionary according to the high-frequency ultrasound detection signal in step S2 is:

selecting iteration parameters according to the high-frequency ultrasound detection signal, and constructing the discrete overcomplete dictionary.

Preferably, the iteration parameters include a dictionary matrix $D \in R^{M \times X}$, a coefficient matrix $\alpha \in R^{k \times M}$, an index set $\omega_m$, and a residual $E_m$.

Preferably, the reconstructing the high-frequency ultrasound detection signal by using a trained dictionary and using a multipath matching pursuit algorithm, and obtaining a global optimal atom in step S3 specifically includes the following steps:

S31: giving a dictionary D, a to-be-processed signal y, and a sparsity k, initializing a sparse coefficient $\alpha_0=0$ and a residual $r_0=y$, and reconstructing an atom set $\Omega_0=\phi$ and an index set $\omega_0=\phi$;

S32: for a $t^{th}$ iteration, calculating a residual $r_{t-1}$, taking inner products of all atoms in the dictionary matrix D, finding G corresponding atoms with the largest inner products and corresponding indices, only keeping n paths according to each iteration, setting a threshold according to an inner product of a current optimal atom and the residual, and eliminating a selected atom if an inner product of the atom and a signal is less than the threshold;

S33: updating an index set $\omega_t$ and a corresponding reconstructed atom set $\Omega_t$:

$$\omega_t = [\omega_{t-1}, \lambda_t],$$

and $$\Omega_t = [\Omega_{t-1}, \hat{d}_{\lambda_t}];$$

wherein $\lambda_t$ represents a $t^{th}$ iteration index, $\hat{d}_{\lambda_t}$ represents a atom for the $t^{th}$ iteration;

S34: calculating a sparse coefficient at of the reconstructed atom set $\Omega_t$ corresponding to the signal y by using a least squares method;

S35: determining whether an iteration termination condition is met, and if the iteration termination condition is met, stopping the iteration and restoring a sparse coefficient α by using the index set $\omega_t$, or if the iteration termination condition is not met, letting t=t+1, until the iteration ends; and S36: selecting a path with the smallest residual from all the paths for output, to obtain the global optimal atom.

Preferably, the performing interpolation on the global optimal atom, and constructing a consecutive atomic library in step S4 specifically includes the following steps:

constructing the consecutive atomic library near a frequency of the global optimal atom by using polar coordinate interpolation, specifically represented as follows:

a starting atom $$d(f_a) = d\left(f_n - \frac{\Delta}{2}\right),$$

an initial atom $d(f_b)=d(f_n)$, and an ending atom $$d(f_c) = d\left(f_n + \frac{\Delta}{2}\right),$$

$$d(f_a) = c(f_n) + r\cos(\theta)u(f_n) - r\sin(\theta)v(f_n),$$

$$d(f_b) = c(f_n) + r\cos(\theta)u(f_n),$$

and $$d(f_c) = c(f_n) + r\cos(\theta)u(f_n) + r\sin(\theta)v(f_n),$$

where f represents the frequency, $f_a$, $f_b$, $f_c$, $f_i$ and $f_n$ represent a starting atom frequency, an initial atom frequency, ending atom frequency, random atom frequency and unit atom frequency respectively; $d(f_n)$ represents a global optimal atom selected from a discrete dictionary, $c(f_n)$ represents a center of circle of the consecutive atomic library formed by $d(f_a)$, $d(f_b)$, and $d(f_c)$, $u(f_n)$ represents a unit vector pointing from the center of circle to the initial atom $d(f_b)$, $v(f_n)$ represents a unit vector that is on an arc plane and is perpendicular to $u(f_n)$, r represents a radius of circle, and θ represents an angle between the starting atom and the initial atom.

Preferably, the reconstructing the high-frequency ultrasound detection signal in the consecutive atomic library according to a parameter of the global optimal atom, to complete signal denoising in step S5 specifically includes the following steps:

S51: representing, according to the atomic library, any atom as:

$$d(f_i) = c(f_n) + r\cos\left(\frac{2(f_i - f_n)}{\Delta}\theta\right)u(f_n) + r\sin\left(\frac{2(f_i - f_n)}{\Delta}\theta\right)v(f_n),$$

where Δ represents a size of the constructed consecutive atomic library, that is, the atomic library is constructed in a region with a range of Δ;

S52: taking an atomic amplitude into consideration, and representing any atom as:

$$ad(f_i) = ac(f_n) + a\cos\left(\frac{2(f_i - f_n)}{\Delta}\theta\right)u(f_n) + a\sin\left(\frac{2(f_i - f_n)}{\Delta}\theta\right)v(f_n),$$

where α represents the atomic amplitude;

S53: enlarging a selection region:

letting $$\alpha_i = a,$$

$$\beta_i = ar\cos\left(\frac{2(f_i - f_n)}{\Delta}\theta\right),$$

and $$\gamma_i = ar\sin\left(\frac{2(f_i - f_n)}{\Delta}\theta\right),$$

$$\alpha_i \geq 0$$

$$\beta_i^2 + \gamma_i^2 \leq \alpha_i^2 r_i^2,$$

and $$\alpha_i r_i \cos(\theta) \leq \beta_i \leq \alpha_i r,$$

wherein $r_i$ represents a radius of circle of an atomic library;

S54: obtaining a final signal Y by solving a task:

$$Y = \text{Minimize: } \left\| y - \sum_{i=1}^{p} (\alpha_i c(f_i) + \beta_i u(f_i) + \gamma_i v(f_i)) \right\|;$$

wherein p represents the number of atoms; and

S55: obtaining a final reconstructed signal by adjusting a parameter of the final signal Y, where the reconstructed signal may be represented as:

$$\beta_i' = \frac{\beta_i \alpha_i r_i}{\sqrt{\beta_i^2 + \gamma_i^2}},$$

$$\gamma_i' = \frac{\gamma_i \alpha_i r_i}{\sqrt{\beta_i^2 + \gamma_i^2}},$$

and $$Y = \sum_{i=1}^{p} (\alpha_i c(f_i) + \beta_i' u(f_i) + \gamma_i' v(f_i)).$$

The embodiments of the present invention provide an improved system for denoising high-frequency ultrasound based on a multipath matching pursuit algorithm. The system includes:

a collection module, configured to acquire a high-frequency ultrasound detection signal of a to-be-tested sample;

a dictionary construction module, configured to: construct a discrete overcomplete dictionary according to the high-frequency ultrasound detection signal, and train the discrete overcomplete dictionary;

a sparse reconstruction module, configured to: reconstruct the high-frequency ultrasound detection signal by using a multipath matching pursuit algorithm, and select a global optimal atom;

an interpolation module, configured to: perform interpolation on the global optimal atom, and construct a consecutive atomic library; and a reconstruction module, configured to reconstruct the high-frequency ultrasound detection signal in the consecutive atomic library according to a parameter of the global optimal atom, to complete signal denoising.

The system is configured to implement the above-mentioned improved method for denoising high-frequency ultrasound based on a multipath matching pursuit algorithm.

The embodiments of the present invention provide a network device. The device includes a processor, a memory, and a bus system. The processor and the memory are connected by the bus system. The memory is configured to store instructions. The processor is configured to execute the instructions stored in the memory, to implement the above-mentioned improved method for denoising high-frequency ultrasound based on a multipath matching pursuit algorithm.

The embodiments of the present invention provide a computer storage medium. The computer storage medium stores a computer software product. The computer software product includes several instructions, used for enabling a computer device to perform the above-mentioned the improved method for denoising high-frequency ultrasound based on a multipath matching pursuit algorithm.

Compared with the prior art, the present invention has the following beneficial effects:

Embodiments of the present invention provide an improved method and system for denoising high-frequency ultrasound based on a multipath matching pursuit algorithm. In the present invention, signal reconstruction precision is improved by constructing a discrete overcomplete dictionary is and using a multipath matching pursuit algorithm. A global optimal path is selected from a plurality of paths, a global optimal atom is selected by using the multipath matching pursuit algorithm, and path selection is reduced by using a pruning operation and threshold selection, thereby reducing an amount of calculation. Then a consecutive atomic library is constructed near a frequency of the global optimal atom by using polar coordinate interpolation, and an error between a signal and a discrete dictionary is eliminated by adjusting a parameter of the global optimal atom. In the present invention, a signal-to-noise ratio of a high-frequency ultrasound signal is improved, and a reflected echo signal of a tiny defect is observed more effectively, so that the accuracy and reliability of detecting a microdefect using high-frequency ultrasound are improved.

BRIEF DESCRIPTION OF THE DRAWINGS

To describe the technical solutions in the embodiments of the present invention or in the prior art more clearly, the accompanying drawings that need to be used in the embodiments are briefly described below. The features and advantages of the present invention will be more clearly understood by referring to the accompanying drawings, which are schematic and should not be construed as limiting the present invention in any way. A person of ordinary skill in the art can obtain other accompanying drawings without creative efforts based on these accompanying drawings. Where.

DETAILED DESCRIPTION OF THE PREFERRED EMBODIMENTS

In order to make the objectives, technical solutions and advantages of the embodiments of the present invention clearer, the technical solutions in the embodiments of the present invention will be clearly and completely described below in conjunction with the accompanying drawings in the embodiments of the present invention. Obviously, the described embodiments are some of the embodiments of the present invention, rather than all of the embodiments. All other embodiments obtained by persons of ordinary skill in the art based on the embodiments of the present disclosure without creative efforts fall within the protection scope of the present disclosure.

Embodiment 1

Figure 1:
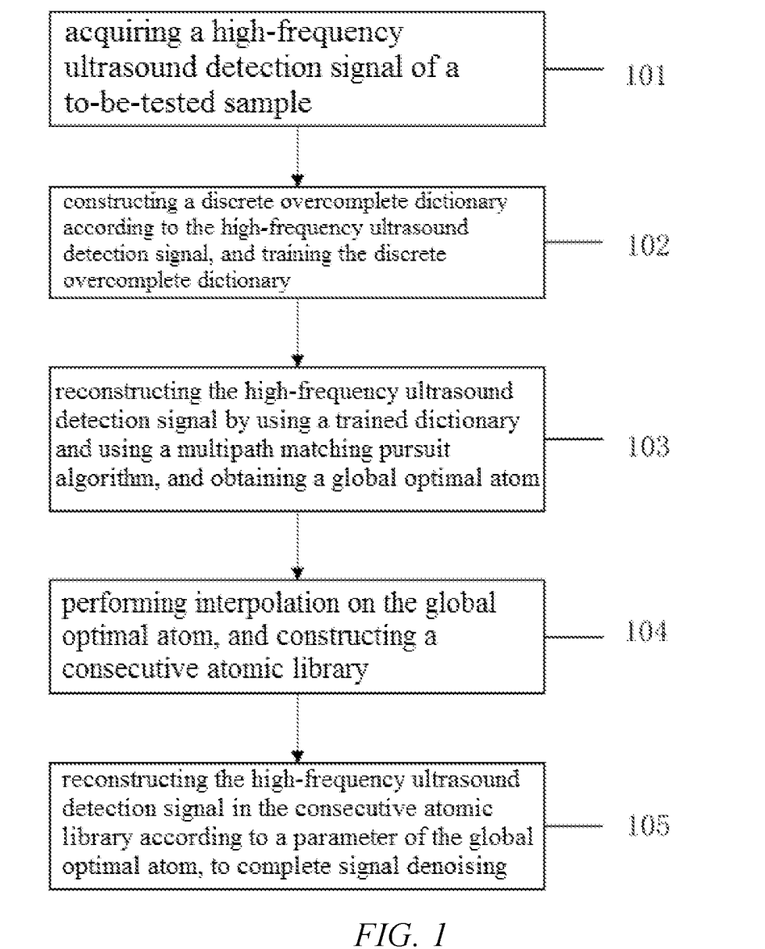
FIG. 1 is a flowchart of an improved method for denoising high-frequency ultrasound based on a multipath matching pursuit algorithm according to an embodiment of the present invention.

This embodiment of the present invention provides an improved method for denoising high-frequency ultrasound based on a multipath matching pursuit algorithm. As shown in FIG. 1, the method in this embodiment includes the following steps.

S101: Acquire a high-frequency ultrasound detection signal of a to-be-tested sample.

S102: Construct a discrete overcomplete dictionary according to the high-frequency ultrasound detection signal, and train the discrete overcomplete dictionary.

S103: Reconstruct the high-frequency ultrasound detection signal by using a trained dictionary and using a multipath matching pursuit algorithm, and obtain a global optimal atom.

S104: Perform interpolation on the global optimal atom, and construct a consecutive atomic library.

S105: Reconstruct the high-frequency ultrasound detection signal in the consecutive atomic library according to a parameter of the global optimal atom, to complete signal denoising.

This embodiment of the present invention provides an improved method for denoising high-frequency ultrasound based on a multipath matching pursuit algorithm. In the present invention, signal reconstruction precision is improved by constructing a discrete overcomplete dictionary is and using a multipath matching pursuit algorithm. A global optimal path is selected from a plurality of paths, a global optimal atom is selected by using the multipath matching pursuit algorithm, and path selection is reduced by using a pruning operation and threshold selection, thereby reducing an amount of calculation. Then a consecutive atomic library is constructed near a frequency of the global optimal atom by using polar coordinate interpolation, and an error between a signal and a discrete dictionary is eliminated by adjusting a parameter of the global optimal atom. In the present invention, a signal-to-noise ratio of a high-frequency ultrasound signal is improved, and a reflected echo signal of a tiny defect is observed more effectively, so that the accuracy and reliability of detecting a microdefect using high-frequency ultrasound are improved.

Further, a method for acquiring a high-frequency ultrasound detection signal of a to-be-tested sample in step S101 is:

preparing high-purity deionized water as a coupling medium, completely immersing the to-be-tested sample in deionized water, scanning the to-be-tested sample by using a high-frequency ultrasound probe, and saving a high-frequency ultrasound echo time domain signal acquired in a scanning process, where a focal plane of the high-frequency ultrasound probe is disposed on a bottom surface of the to-be-tested sample.

Further, a method for constructing a discrete overcomplete dictionary according to the high-frequency ultrasound detection signal in step S102 is:

selecting iteration parameters according to the high-frequency ultrasound echo time domain signal, and constructing the discrete overcomplete dictionary by using a Gabor atom.

The iteration parameters include a dictionary matrix $D \in R^{M \times X}$, a coefficient matrix $\alpha \in R^{k \times M}$, an index set $\omega_m$, and a residual $E_m$.

Further, the reconstructing the high-frequency ultrasound detection signal by using a trained dictionary and using a multipath matching pursuit algorithm added with a pruning operation and threshold selection, and obtaining a global optimal atom in step S103 specifically includes the following steps.

S31: Give a dictionary D, a to-be-processed signal y, and a sparsity k, initialize a sparse coefficient $\alpha_0=0$ and a residual $r_0=y$, and reconstruct an atom set $\Omega_0=\phi$ and an index set $\omega_0=\phi$.

S32: For a $t^{th}$ iteration, calculate a residual $r_{t-1}$, take inner products of all atoms in the dictionary matrix D, find G corresponding atoms with the largest inner products and corresponding indices, only keep n paths according to each iteration, set a threshold according to an inner product of a current optimal atom and the residual, and eliminate a selected atom if an inner product of the atom and a signal is less than the threshold.

S33: Update an index set $\omega_t$ and a corresponding reconstructed atom set $\Omega_t$:

$$\omega_t = [\omega_{t-1}, \lambda_t],$$

and $$\Omega_t = [\Omega_{t-1}, \widehat{d_{\lambda_t}}].$$

wherein $\lambda_t$ represents a $t^{th}$ iteration index, $\widehat{d_{\lambda_t}}$ represents a atom for the $t^{th}$ iteration;

S34: Calculate a sparse coefficient $\alpha_t$ of the reconstructed atom set $\Omega_t$ corresponding to the signal y by using a least squares method.

S35: Determine whether an iteration termination condition is met, and if the iteration termination condition is met, stop the iteration and restoring a sparse coefficient α by using the index set $\omega_t$, or if the iteration termination condition is not met, let $t=t+1$, until the iteration ends.

S36: Select a path with the smallest residual from all the paths for output, to obtain the global optimal atom.

Further, the performing interpolation on the global optimal atom, and constructing a consecutive atomic library in step S104 specifically includes the following steps:

constructing the consecutive atomic library near a frequency of the global optimal atom by using polar coordinate interpolation, specifically represented as follows:

a starting atom $$d(f_a) = d\left(f_n - \frac{\Delta}{2}\right),$$

an initial atom $d(f_b)=d(f_n)$, and an ending atom $$d(f_c) = d\left(f_n + \frac{\Delta}{2}\right),$$

$$d(f_a) = c(f_n) + r\cos(\theta)u(f_n) - r\sin(\theta)v(f_n),$$

$$d(f_b) = c(f_n) + r\cos(\theta)u(f_n), \text{ and}$$

$$d(f_c) = c(f_n) + r\cos(\theta)u(f_n) + r\sin(\theta)v(f_n),$$

Where f represents the frequency, $f_a$, $f_b$, $f_c$, $f_i$ and $f_n$ represent a starting atom frequency, an initial atom frequency, ending atom frequency, random atom frequency and unit atom frequency respectively; $d(f_n)$ represents a global optimal atom selected from a discrete dictionary, $c(f_n)$ represents a center of circle of the consecutive atomic library formed by $d(f_a)$, $d(f_b)$, and $d(f_c)$, $u(f_n)$ represents a unit vector pointing from the center of circle to the initial atom $d(f_b)$, $v(f_n)$ represents a unit vector that is on an arc plane and is perpendicular to $u(f_n)$, r represents a radius of circle, and θ represents an angle between the starting atom and the initial atom.

Further, the reconstructing the high-frequency ultrasound detection signal in the consecutive atomic library according to a parameter of the global optimal atom, to complete signal denoising in step S105 specifically includes the following steps.

S51: Represent, according to the atomic library, any atom as:

$$d(f_i) = c(f_n) + r\cos\left(\frac{2(f_i - f_n)}{\Delta}\theta\right)u(f_n) + r\sin\left(\frac{2(f_i - f_n)}{\Delta}\theta\right)v(f_n),$$

where Δ represents a size of the constructed consecutive atomic library, that is, the atomic library is constructed in a region with a range of Δ.

S52: Take an atomic amplitude into consideration, and represent any atom as:

$$ad(f_i) = ac(f_n) + ar\cos\left(\frac{2(f_i - f_n)}{\Delta}\theta\right)u(f_n) + ar\sin\left(\frac{2(f_i - f_n)}{\Delta}\theta\right)v(f_n),$$

where α represents the atomic amplitude.

S53: Enlarge a selection region:

$$\alpha_i = a, \beta_i = ar\cos\left(\frac{2(f_i - f_n)}{\Delta}\theta\right), \text{ and } \gamma_i = ar\sin\left(\frac{2(f_i - f_n)}{\Delta}\theta\right),$$

$$\alpha_i \geq 0,$$

$$\beta_i^2 + \gamma_i^2 \leq \alpha_i^2 r_i^2, \text{ and}$$

$$\alpha_i r_i \cos(\theta) \leq \beta_i \leq \alpha_i r.$$

wherein $r_i$ represents a radius of circle of an atomic library;

S54: Obtain a final signal by solving a task:

$$Y = \text{Minimize:} \left\| y - \sum_{i=1}^{p} (\alpha_i c(f_i) + \beta_i u(f_i) + \gamma_i v(f_i)) \right\|.$$

wherein p represents the number of atoms;

S55: Obtain a final reconstructed signal by adjusting a parameter of the final signal Y, where the reconstructed signal may be represented as:

$$\beta'_i = \frac{\beta_i \alpha_i r_i}{\sqrt{\beta_i^2 + \gamma_i^2}}, \gamma'_i = \frac{\gamma_i \alpha_i r_i}{\sqrt{\beta_i^2 + \gamma_i^2}}, \text{ and}$$

$$Y = \sum_{i=1}^{p} (\alpha_i c(f_i) + \beta'_i u(f_i) + \gamma'_i v(f_i)).$$

Figure 2:
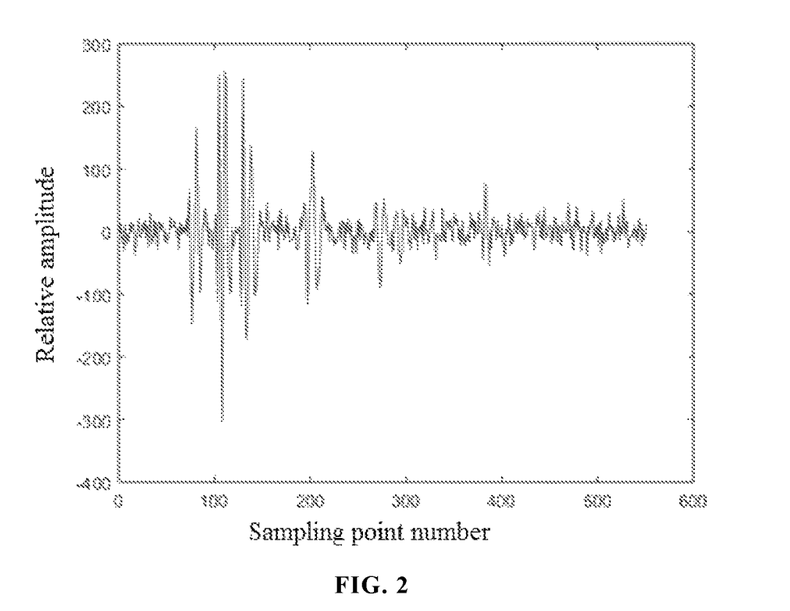
FIG. 2 is a waveform graph of an original high-frequency ultrasound detection signal according to an embodiment of the present invention.
Figure 3:
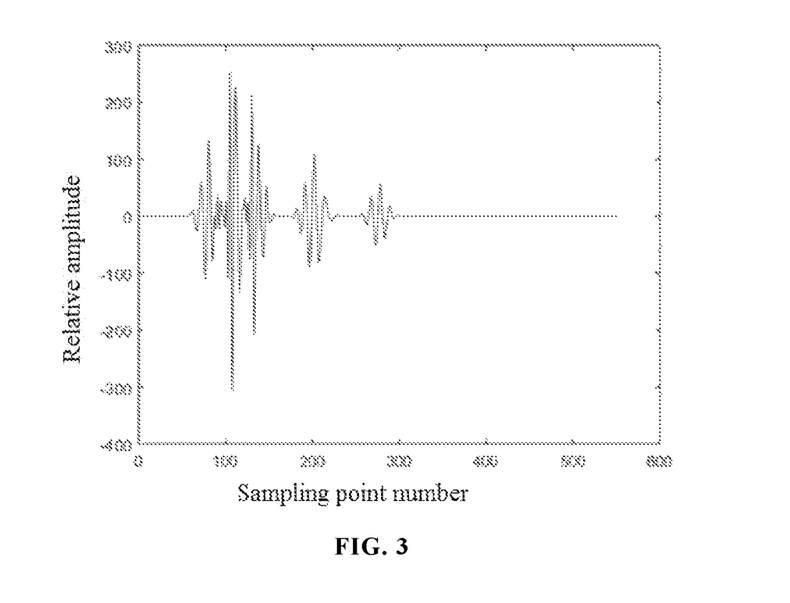
FIG. 3 is a waveform graph of an original high-frequency ultrasound detection signal after denoising according to an embodiment of the present invention.

During actual application of this application, after a high-frequency ultrasound detection signal of a to-be-tested sample is processed by using the above-mentioned method, compared with an original signal, interference of noise is adequately eliminated in a reconstructed high-frequency ultrasound signal, so that the accuracy and reliability of recognizing a position of a microdefect in tomography scans is effectively improved, and signal processing efficiency is improved. The applicant further proves the feasibility and accuracy of the above-mentioned method by using the following actual experiment. Specifically:

The experiment is used for validating that the present invention has good denoising effect for a high-frequency ultrasound signal. In this experiment, the ultrasound scanning microscope SAM 300E is used to detect a flip chip and extract an echo signal. The chip used in the experiment is an area array chip made by the American company Practical Components, and the model is FA10-200×200. The frequency of the detection ultrasound is 110 MHz, and a signal sampling length is 550 sampling points. The obtained high-frequency ultrasound detection signal is shown in FIG. 2. It can be clearly seen in FIG. 2 that an echo signal with a low amplitude is drowned out in noise and is hardly distinguishable, which easily causes a detection miss or false detection of a microdefect. Sparse reconstruction is performed on the signal by using the method provided in this application. A denoised signal is shown in FIG. 3. Compared with FIG. 2, in the signal after sparse reconstruction, interference of noise is effectively removed, and a reflective feature of the signal is clearer. The sparse reconstruction of the high-frequency ultrasound signal can effectively improve a signal-to-noise ratio of the signal, so that the accuracy and reliability of recognizing a microdefect using high-frequency ultrasound detection are improved.

Embodiment 2

Figure 4:
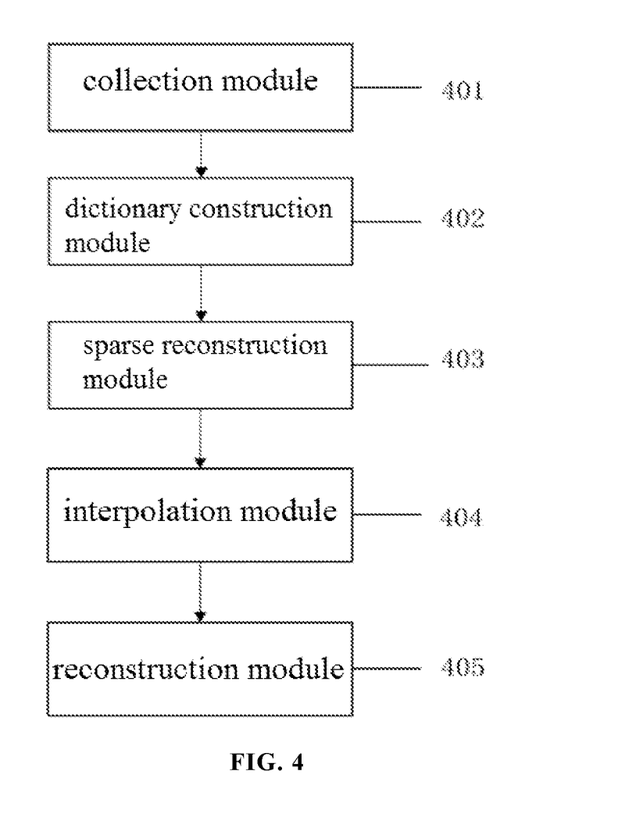
FIG. 4 is a schematic diagram of an improved system for denoising high-frequency ultrasound based on a multipath matching pursuit algorithm according to an embodiment of the present invention.

This embodiment of the present invention provides an improved system for denoising high-frequency ultrasound based on a multipath matching pursuit algorithm. As shown in FIG. 4, the system includes:

a collection module 401, configured to acquire a high-frequency ultrasound detection signal of a to-be-tested sample;

a dictionary construction module 402, configured to: construct a discrete overcomplete dictionary according to the high-frequency ultrasound detection signal, and train the discrete overcomplete dictionary;

a sparse reconstruction module 403, configured to: reconstruct the high-frequency ultrasound detection signal by using a multipath matching pursuit algorithm, and obtain a global optimal atom;

an interpolation module 404, configured to: perform interpolation on the global optimal atom, and construct a consecutive atomic library; and a reconstruction module 405, configured to reconstruct the high-frequency ultrasound detection signal in the consecutive atomic library according to a parameter of the global optimal atom, to complete signal denoising.

The system is configured to implement the above-mentioned improved method for denoising high-frequency ultrasound based on a multipath matching pursuit algorithm in Embodiment 1. To avoid redundancy, details are not described again herein.

Embodiment 3

Figure 5:
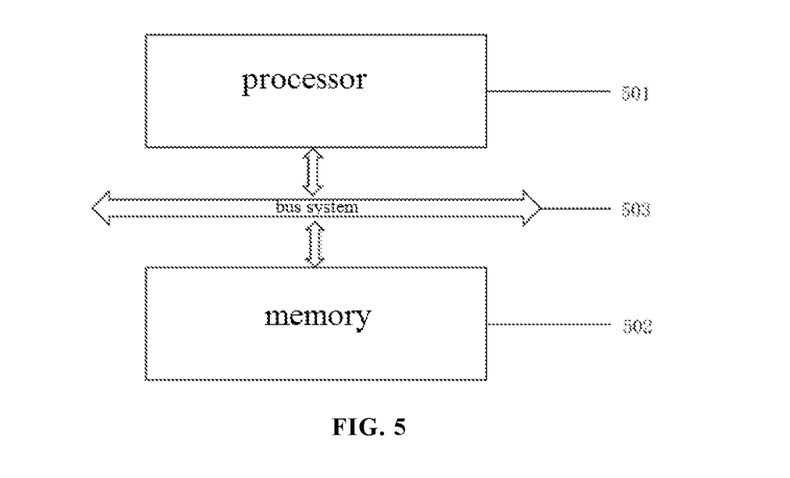
FIG. 5 is a schematic diagram of a network device according to an embodiment of the present invention.

This embodiment of the present invention provides a network device. As shown in FIG. 5, the device includes a processor 501, a memory 502, and a bus system 503. The processor 501 and the memory 502 are connected by the bus system 503. The memory 502 is configured to store instructions. The processor 501 is configured to execute the instructions stored in the memory 502.

It should be understood that in this embodiment of the present invention, the processor 501 may be a central processing unit (CPU). The processor 501 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 502 may include a read-only memory (ROM) and a random access memory (RAM), and provide instructions and data to the processor 501. A part of the memory 502 may further include a non-volatile RAM. For example, the memory 502 may further store information about a device type.

The bus system 503 may further include a power bus, a control bus, a status signal bus, and the like in addition to a data bus. However, for clear description, various buses in the figure are shown as the bus system 503.

During implementation, the steps in the foregoing method may be accomplished by hardware integrated logic circuits or instructions in a software form in the processor 501. The steps of the methods disclosed with reference to embodiments of the present invention may be directly implemented by a hardware processor, or may be implemented by using a combination of hardware in a processor and a software module. The software modules may be located in a mature storage medium such as a RAM, a flash memory, a ROM, a PROM or an electrically erasable programmable memory or a register in the art. The storage medium is located in the storage 502. The processor 501 reads information in the storage 502 and accomplishes the steps in the foregoing method in combination with hardware of the processor. To avoid repetition, details are not described herein again.

Embodiment 4

The embodiments of the present invention provide a computer storage medium. The computer storage medium stores a computer software product. The computer software product includes several instructions, used for enabling a computer device (which may be a personal computer, a server, a network device, or the like) to perform all or some steps of the method in the embodiments of the present invention. The foregoing storage medium includes: any medium that can store program code, such as a USB flash drive, a removable hard disk, a ROM, a RAM, a magnetic disk, or an optical disc.

Persons skilled in the art should understand that the embodiments of this application may be provided as a method, a system, or a computer program product. Therefore, this application may use a form of a hardware-only embodiment, a software-only embodiment, or an embodiment with a combination of software and hardware.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software function unit.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

It may be understood that various numbers in embodiments of this application are merely used for differentiation for ease of description, and are not used to limit the scope of embodiments of this application.

It may be understood that sequence numbers of the foregoing processes do not mean execution sequences in the embodiments of the present invention. The execution sequences of the processes should be determined according to functions and internal logic of the processes, and should not be construed as any limitation on the implementation processes of embodiments of this application.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, without departing from the scope of the technical solutions of the embodiments of the present invention.

What is claimed is:

1. An improved method for denoising high-frequency ultrasound based on a multipath matching pursuit algorithm, comprising:
    S1: acquiring a high-frequency ultrasound detection signal of a to-be-tested sample;
    S2: constructing a discrete overcomplete dictionary according to the high-frequency ultrasound detection signal, and training the discrete overcomplete dictionary;
    S3: reconstructing the high-frequency ultrasound detection signal by using a trained dictionary and using a multipath matching pursuit algorithm, and obtaining a global optimal atom;
    S4: performing interpolation on the global optimal atom, and constructing a consecutive atomic library; and
    S5: reconstructing the high-frequency ultrasound detection signal in the consecutive atomic library according to a parameter of the global optimal atom, to complete signal denoising,
    wherein the reconstructing the high-frequency ultrasound detection signal by using a trained dictionary and using a multipath matching pursuit algorithm, and obtaining a global optimal atom in step S3 specifically comprises steps of:
    S31: giving a dictionary D, a to-be-processed signal y, and a sparsity k, initializing a sparse coefficient $\alpha_0=0$ and a residual $r_0=y$, and reconstructing an atom set $\Omega_0=\phi$ and an index set $\omega_0=\phi$;
    S32: for a $t^{th}$ iteration, calculating a residual $r_{t-1}$, taking inner products of all atoms in the dictionary matrix D, finding G corresponding atoms with the largest inner products and corresponding indices, only keeping n paths according to each iteration, setting a threshold according to an inner product of a current optimal atom and the residual, and eliminating a selected atom if an inner product of the atom and a signal is less than the threshold;
    S33: updating an index set $\omega_t$ and a corresponding reconstructed atom set $\Omega_t$:

$$\omega_t = [\omega_{t-1}, \lambda_t], \Omega_t = [\Omega_{t-1}, \widehat{d_{\lambda_t}}];$$

wherein $\lambda_t$ represents a $t^{th}$ iteration index, $\widehat{d_{\lambda_t}}$ represents an atom for the $t^{th}$ iteration;
    S34: calculating a sparse coefficient $\alpha_t$ of the reconstructed atom set $\Omega_t$ corresponding to the to-be-processed signal y;
    S35: determining whether an iteration termination condition is met, and if the iteration termination condition is met, stopping the iteration and restoring a sparse coefficient $\alpha$ by using the index set $\omega_t$, or if the iteration termination condition is not met, letting t=t+1, until the iteration ends; and
    S36: selecting a path with the smallest residual from all the paths for output, to obtain the global optimal atom.

2. The improved method for denoising high-frequency ultrasound based on a multipath matching pursuit algorithm according to claim 1, wherein a method for acquiring a high-frequency ultrasound detection signal of a to-be-tested sample in step S1 comprises:
    completely immersing the to-be-tested sample in deionized water, scanning the to-be-tested sample by using a high-frequency ultrasound probe, and saving a high-frequency ultrasound detection signal acquired during scanning, wherein a focal plane of the high-frequency ultrasound probe is disposed on a bottom surface of the to-be-tested sample.

3. The improved method for denoising high-frequency ultrasound based on a multipath matching pursuit algorithm according to claim 1, wherein a method for constructing a discrete overcomplete dictionary according to the high-frequency ultrasound detection signal in step S2 comprises:

selecting iteration parameters according to the high-frequency ultrasound detection signal, and constructing the discrete overcomplete dictionary.

4. The improved method for denoising high-frequency ultrasound based on a multipath matching pursuit algorithm according to claim 3, wherein the iteration parameters comprise a dictionary matrix $D \in R^{M \times X}$, a coefficient matrix $\alpha \in R^{k \times M}$, an index set $\omega_m$, and a residual $E_m$.

5. The improved method for denoising high-frequency ultrasound based on a multipath matching pursuit algorithm according to claim 1, wherein the performing interpolation on the global optimal atom, and constructing a consecutive atomic library in step S4 specifically comprises steps of:
constructing the consecutive atomic library near a frequency of the global optimal atom by using polar coordinate interpolation, specifically represented as follows:
a starting atom $$d(f_a) = d\left(f_n - \frac{\Delta}{2}\right),$$

an initial atom $d(f_b)=d(f_n)$, and an ending atom $$d(f_c) = d\left(f_n + \frac{\Delta}{2}\right),$$

$$d(f_a) = c(f_n) + r\cos(\theta)u(f_n) - r\sin(\theta)v(f_n),$$

$$d(f_b) = c(f_n) + r\cos(\theta)u(f_n), \text{ and}$$

$$d(f_c) = c(f_n) + r\cos(\theta)u(f_n) + r\sin(\theta)v(f_n),$$

wherein f represents the frequency, $f_a$, $f_b$, $f_c$, $f_i$ and $f_n$ represent a starting atom frequency, an initial atom frequency, ending atom frequency, the $i^{th}$ atom frequency and the $n^{th}$ atom frequency respectively; $d(f_n)$ represents a global optimal atom selected from a discrete dictionary, $c(f_n)$ represents a center of circle of the consecutive atomic library formed by $d(f_a)$, $d(f_b)$, and $d(f_c)$, $u(f_n)$ represents a unit vector pointing from the center of circle to the initial atom $d(f_b)$, $v(f_n)$ represents a unit vector that is on an arc plane and is perpendicular to $u(f_n)$, r represents a radius of circle, and $\theta$ represents an angle between the starting atom and the initial atom.

6. The improved method for denoising high-frequency ultrasound based on a multipath matching pursuit algorithm according to claim 5, wherein the reconstructing the high-frequency ultrasound detection signal in the consecutive atomic library according to a parameter of the global optimal atom, to complete signal denoising in step S5 specifically comprises steps of:
S51: representing, according to the atomic library, any atom as:

$$d(f_i) = c(f_n) + r\cos\left(\frac{2(f_i - f_n)}{\Delta}\theta\right)u(f_n) + r\sin\left(\frac{2(f_i - f_n)}{\Delta}\theta\right)v(f_n),$$

wherein $\Delta$ represents a size of the constructed consecutive atomic library, that is, the atomic library is constructed in a region with a range of $\Delta$;

S52: taking an atomic amplitude into consideration, and representing any atom as:

$$ad(f_i) = ac(f_n) + ar\cos\left(\frac{2(f_i - f_n)}{\Delta}\theta\right)u(f_n) + ar\sin\left(\frac{2(f_i - f_n)}{\Delta}\theta\right)v(f_n),$$

wherein a represents the atomic amplitude;
S53: enlarging a selection region:
letting $$\alpha_i = a, \beta_i = ar\cos\left(\frac{2(f_i - f_n)}{\Delta}\theta\right), \text{ and } \gamma_i = ar\sin\left(\frac{2(f_i - f_n)}{\Delta}\theta\right),$$

$$\alpha_i \geq 0,$$

$$\beta_i^2 + \gamma_i^2 \leq \alpha_i^2 r_i^2, \text{ and}$$

$$\alpha_i r_i \cos(\theta) \leq \beta_i \leq \alpha_i r;$$

wherein $r_i$ represents a radius of circle of an atomic library;
S54: obtaining a final signal Y by solving a task:

$$Y = \text{Minimize: } \left\| y - \sum_{i=1}^{p}(\alpha_i c(f_i) + \beta_i u(f_i) + \gamma_i v(f_i)) \right\|;$$

and
wherein p represents the number of atoms;
S55: obtaining a final reconstructed signal by adjusting a parameter of the final signal Y, wherein the reconstructed signal may be represented as:

$$\beta_i' = \frac{\beta_i \alpha_i r_i}{\sqrt{\beta_i^2 + \gamma_i^2}}, \gamma_i' = \frac{\gamma_i \alpha_i r_i}{\sqrt{\beta_i^2 + \gamma_i^2}}, \text{ and}$$

$$Y = \sum_{i=1}^{p}(\alpha_i c(f_i) + \beta_i' u(f_i) + \gamma_i' v(f_i)).$$

7. An improved system to implement the method according to claim 1 for denoising high-frequency ultrasound based on a multipath matching pursuit algorithm, comprising:
a collection module, configured to acquire a high-frequency ultrasound detection signal of a to-be-tested sample;
a dictionary construction module, configured to: construct a discrete overcomplete dictionary according to the high-frequency ultrasound detection signal, and train the discrete overcomplete dictionary;
a sparse reconstruction module, configured to: reconstruct the high-frequency ultrasound detection signal by using a multipath matching pursuit algorithm, and obtain a global optimal atom;
an interpolation module, configured to: perform interpolation on the global optimal atom, and construct a consecutive atomic library; and
a reconstruction module, configured to reconstruct the high-frequency ultrasound detection signal in the consecutive atomic library according to a parameter of the global optimal atom, to complete signal denoising.

8. A network device, comprising a processor, a memory, and a bus system, wherein the processor and the memory are connected by the bus system, the memory is configured to store instructions, and the processor is configured to execute the instructions stored in the memory, to implement the method according to claim 1.

9. A computer storage medium, wherein the computer storage medium stores a computer software product, and the computer software product comprises several instructions, used for enabling a computer device to implement the method according to claim 1.

* * * * *